United States Patent
Ichikawa et al.

(10) Patent No.: US 7,325,448 B2
(45) Date of Patent: Feb. 5, 2008

(54) PNEUMATIC-TIRE-USE ELECTRONIC-DEVICE FIXING SYSTEM, AND ELECTRONIC-DEVICE HOUSING APPARATUS

(75) Inventors: Hiromitsu Ichikawa, Kodaira (JP); Hiromasa Hada, Kodaira (JP); Takao Kokubu, Akishima (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 10/591,590

(22) PCT Filed: Mar. 2, 2005

(86) PCT No.: PCT/JP2005/003478

§ 371 (c)(1),
(2), (4) Date: Sep. 5, 2006

(87) PCT Pub. No.: WO2005/082644

PCT Pub. Date: Sep. 9, 2005

(65) Prior Publication Data
US 2007/0169865 A1    Jul. 26, 2007

(30) Foreign Application Priority Data
Mar. 2, 2004  (JP)  ............... 2004-058063

(51) Int. Cl.
*B60C 23/02* (2006.01)
(52) U.S. Cl. .................. 73/146.5; 73/146
(58) Field of Classification Search ....... 73/146–146.8; 340/442–447

See application file for complete search history.

(56) References Cited

U.S. PATENT DOCUMENTS

| | | | | | |
|---|---|---|---|---|---|
| 3,872,424 | A | * | 3/1975 | Enabnit | 340/442 |
| 4,052,696 | A | * | 10/1977 | Enabnit | 340/448 |
| 4,099,157 | A | * | 7/1978 | Enabnit | 340/507 |
| 5,218,861 | A | * | 6/1993 | Brown et al. | 340/448 |
| 5,962,778 | A | * | 10/1999 | Billieres | 73/146 |

FOREIGN PATENT DOCUMENTS

| | | |
|---|---|---|
| JP | 11-278021 A | 10/1999 |
| JP | 2002-502765 A | 1/2002 |

(Continued)

*Primary Examiner*—Edward Lefkowitz
*Assistant Examiner*—Jermaine Jenkins
(74) *Attorney, Agent, or Firm*—Sughrue Mion, PLLC (57) ABSTRACT

A pneumatic-tire-use electronic-device fixing system according to the present invention includes: an electronic-device housing apparatus 30, which houses the electronic device, and which includes an engaging convex portion 32 that is convex; and an electronic-device housing apparatus support 12, which is provided on an inner surface of the pneumatic tire, and which includes an engaging concave portion that is concave. First pullout suppression means which suppresses pullout of the engaging convex portion from the engaging concave portion is provided on at least a part of a surface of the engaging convex portion, and second pullout suppression means which engages with the first pullout suppression means is provided on at least a part of a surface of the engaging concave portion. According to the present invention, it becomes possible to provide a pneumatic-tire-use electronic-device fixing system, a pneumatic tire, and an electronic-device housing apparatus, which are capable of securely fixing the pneumatic-tire-use electronic device, and also capable of suppressing breakage of a fixing portion for fixing a pneumatic-tire-use electronic device.

11 Claims, 11 Drawing Sheets

| | FOREIGN PATENT DOCUMENTS | | | WO | 99/41093 A1 | 8/1999 |
|---|---|---|---|---|---|---|
| | | | | WO | 00/007834 A2 | 2/2000 |
| JP | 2002-524326 A | 8/2002 | | WO | 00/47430 A1 | 8/2000 |
| JP | 2002-541003 A | 12/2002 | | | | |
| JP | 2003-054228 A | 2/2003 | | * cited by examiner | | |

PNEUMATIC-TIRE-USE ELECTRONIC-DEVICE FIXING SYSTEM, AND ELECTRONIC-DEVICE HOUSING APPARATUS

TECHNICAL FIELD

The present invention relates to: a pneumatic-tire-use electronic-device fixing system for fixing an electronic device mounted on a pneumatic tire; a pneumatic tire provided with an electronic-device housing apparatus support for supporting an electronic-device housing apparatus which houses the electronic device; and the electronic-device housing apparatus.

BACKGROUND ART

Conventionally, there have been developed technologies for mounting, on a pneumatic tire, an electronic device (hereinafter, referred to as a pneumatic-tire-use electronic-device) such as: a sensor, which measures an internal pressure or an internal temperature of the pneumatic tire, and which transmits a result of the measurement to a vehicle via radio communications; or an IC chip which stores, for example, information management by a manufacturer of the pneumatic tire (for example, Published Japanese Translation of a PCT application No. 2002-502765 (pp. 11-13 and FIG. 1 to 3).

In a case where an electronic device is mounted on an inner side of a pneumatic tire, it is imperative that the electronic device be securely fixed to the pneumatic tire in order to prevent the electronic device from being displaced from a position for the mounting by centrifugal force or vibration generated in association with rotations of the pneumatic tire.

That is, if the electronic device deviates from the mounting position, normal measurement or the like utilizing the electronic device becomes impossible, and not only that, the deviated electronic device is likely to damage an inner liner, and thereby becomes a cause of puncture of the tire.

For example, according to the above described Published Japanese Translation of a PCT Application No. 2002-502765, a projection having a zigzag surface shape is provided on an inner surface of the pneumatic tire. Additionally, the electronic device can be fixed because a locking hole, with which the projection is locked by being inserted therein, is provided on an electronic-device housing apparatus when houses the electronte device.

Incidentally, it can be considered that the pneumatic-tire-use electronic-device as described above is mounted, for so-called aftermarket use, on a pneumatic tire according to need after the pneumatic tire is manufactured.

However, there have been the following problems in the above described technology for mounting a pneumatic-tire-use electronic-device. That is, since the projection is provided on the inner surface of the pneumatic tire, the projection can be broken due to contact on such occasions as when the pneumatic tire is mounted onto a wheel in a case where the pneumatic-tire-use electronic-device (the electronic-device housing apparatus) is mounted on the projection.

Additionally, there has been a problem in the pneumatic tire provided with the projection, that the projection is easy to break due to stress concentrates on an attached portion of the projection to the pneumatic tire. Furthermore, in a case where a fixing portion, such as the projection, for fixing the pneumatic-tire-use electronic-device is additionally stuck on an inner surface of the pneumatic tire after manufacture of the pneumatic tire, there has been another problem that, since strength of the fixing portion cannot be sufficiently secured, the fixing portion tends to come unstuck.

In response, the present invention was made in consideration of the above described problems, and an object thereof is to provide a pneumatic-tire-use electronic-device fixing system, a pneumatic tire and an electronic-device housing apparatus, which are capable of securely fixing a pneumatic-tire-use electronic device, and which are also capable of suppressing breakage of a fixing portion for fixing the pneumatic-tire-use electronic device.

DISCLOSURE OF THE INVENTION

In order to solve the above described problems, the present invention has the following characteristics. First of all, a first characteristic of the present invention is a pneumatic-tire-use electronic-device fixing system for fixing an electronic device to be mounted on a pneumatic tire (a pneumatic tire 10). The first characteristic is summarized in that the pneumatic-tire-use electronic-device is provided with: an electronic-device housing apparatus (for example an electronic-device housing apparatus 30), which houses the electronic device, and which includes an engaging convex portion (for example, an engaging convex portion 32) that is convex; and an electronic-device housing apparatus support (for example, an electronic-device housing apparatus support 12), which is provided on an inner surface of the pneumatic tire, and which includes an engaging concave portion (for example, an engaging concave portion 12*sh*) that is concave. The first characteristic is also summarized in that: first pullout suppression means (for example, projections 32*a*) which suppresses pullout from the engaging concave portion is provided on at least a part of a surface of the engaging convex portion; and second pullout suppression means (for example, engaging grooves 12*g*) which engages with the first pullout suppression means is provided on at least a part of a surface of the engaging concave portion.

A second characteristic of the present invention relates to the first characteristic of the present invention, and is summarized in that: at least a part of the surface of the engaging convex portion includes a first zigzag region formed in a zigzag; and at least a part of the surface of the engaging concave portion includes a second zigzag region formed in a zigzag, the second zigzag region engaging with the first zigzag region.

According to these characteristics, the second pullout suppression means engaging with the first pullout suppression means provided on the electronic-device housing apparatus is provided on at least a part of the surface of the engaging concave portion of the electronic-device housing apparatus support, whereby the electronic-device housing apparatus can be securely fixed to the pneumatic tire.

According to these characteristics, the electronic-device housing apparatus support can be a swelling shape such as, for example, a "pedestal," not a projecting shape, the swelling shape having an increased contact area with the inner surface of the pneumatic tire.

For this reason, even in a case where the electronic device (the electronic-device housing apparatus) is not mounted on the electronic-device housing apparatus support, breakage of the electronic-device housing apparatus support due to contact can be prevented on such occasions as when the pneumatic tire is mounted onto a wheel. Additionally, by increasing the contact area of the electronic-device housing apparatus support, stress against an attached portion of the electronic-device housing apparatus support can be dispersed, whereby occurrence of breakage of the electronic-device housing apparatus support due to the stress can be reduced.

That is, according to these characteristics, while the pneumatic-tire-use electronic device can be securely fixed to the pneumatic tire, breakage of the electronic-device housing apparatus support for fixing the pneumatic-tire-use electronic device can be suppressed.

A third characteristic of the present invention relates to any one of the first and second characteristics of the present invention. The third characteristic is summarized in that: the engaging convex portion includes a first insertion hole (for example, an insertion hole 12fh); the engaging concave portion includes a second insertion hole (an insertion hole 32b) communicating with the first insertion hole; and the pneumatic-tire-use electronic-device fixing system is further provided with a lock pin (a lock pin 50) to be inserted into the first and second insertion holes which have been made to communicate with each other.

A fourth characteristic of the present invention relates to any one of the first to third characteristics of the present invention. The fourth characteristic is summarized in that the electronic-device housing apparatus support is a rubber body provided inside the pneumatic tire inward of an inner liner (an inner liner 11) of the pneumatic tire.

A fifth characteristic of the present invention relates to any one of the first to fourth characteristics of the present invention. The fifth characteristic is summarized in that the electronic-device housing apparatus support is provided on the pneumatic tire in steps of molding and vulcanizing the pneumatic tire.

A sixth characteristic of the present invention is a pneumatic tire including an electronic-device housing apparatus support which supports an electronic device housing apparatus having an engaging convex portion that is convex. The sixth characteristic is summarized in that: the electronic-device housing apparatus support is provided on an inner surface of the pneumatic tire, and includes an engaging concave portion that is concave; and pullout suppression means is provided on at least a part of a surface of the engaging concave portion, the pullout suppression means engaging with the engaging convex portion and thereby suppressing pullout of the engaging convex portion from the engaging concave portion.

A seventh characteristic of the present invention relates to the sixth characteristic of the present invention. The seventh characteristic is summarized in that at least a part of the surface of the engaging concave portion includes a zigzag region formed in a zigzag.

An eighth characteristic of the present invention relates to any one of the sixth and seventh characteristics of the present invention. The eighth characteristic is summarized in that the electronic-device housing apparatus support is a rubber body provided inside the pneumatic tire inward of an inner liner of the pneumatic tire.

A ninth characteristic of the present invention relates to any one of the sixth to eighth characteristics of the present invention. The ninth characteristic is summarized in that the electronic-device housing apparatus support is provided on the pneumatic tire in steps of molding and vulcanizing the pneumatic tire.

A tenth characteristic of the present invention is an electronic-device housing apparatus, which is supported by an electronic-device housing apparatus support including an engaging concave portion provided on a pneumatic tire, and which houses an electronic device mounted on the pneumatic tire. The tenth characteristic is summarized in that: the electronic-device housing apparatus includes an engaging concave portion that is convex; and pullout suppression means, which engages with the engaging convex portion, and which suppresses pullout of the engaging convex portion from the engaging concave portion, is provided on at least a part of a surface of the engaging convex portion.

An eleventh characteristic of the present invention relates to the tenth characteristic of the present invention, and is summarized in that at least a part of the surface of the engaging convex portion includes a first zigzag region formed in a zigzag.

A twelfth characteristic of the present invention relates to any one of the tenth and eleventh characteristics of the present invention, and is summarized in that: the engaging convex portion includes a first insertion hole; the engaging concave portion includes a second insertion hole communicating with the first insertion hole; and the electronic-device housing apparatus is fixed by a lock pin inserted into the first insertion hole and second insertion hole which have been made to communicate with each other.

According to the present invention, it becomes possible to provide a pneumatic-tire-use electronic-device fixing system, a pneumatic tire, and an electronic-device housing apparatus, which are capable of securely fixing the pneumatic-tire-use electronic device, and also capable of suppressing breakage of a fixing portion for fixing a pneumatic-tire-use electronic device.

BEST MODE FOR CARRYING OUT THE INVENTION (Configuration of Pneumatic-tire-use Electronic Device Fixing System According to the Present Embodiment)

Hereinafter, one example of an embodiment of a pneumatic-tire-use electronic device fixing system according to the present embodiment will be described with reference to the drawings. Note that, in the following description on the drawings, the same or similar reference numerals are respectively attached to same or similar elements. However, it should be noted that the drawings are schematic, and that ratios of some measurements to others, and the like, are not to scale. Therefore, specific measurements should be judged in consideration of the following description. Additionally, it goes without saying that the drawings include parts whose relations and ratios are different from each other.

Figure 1:
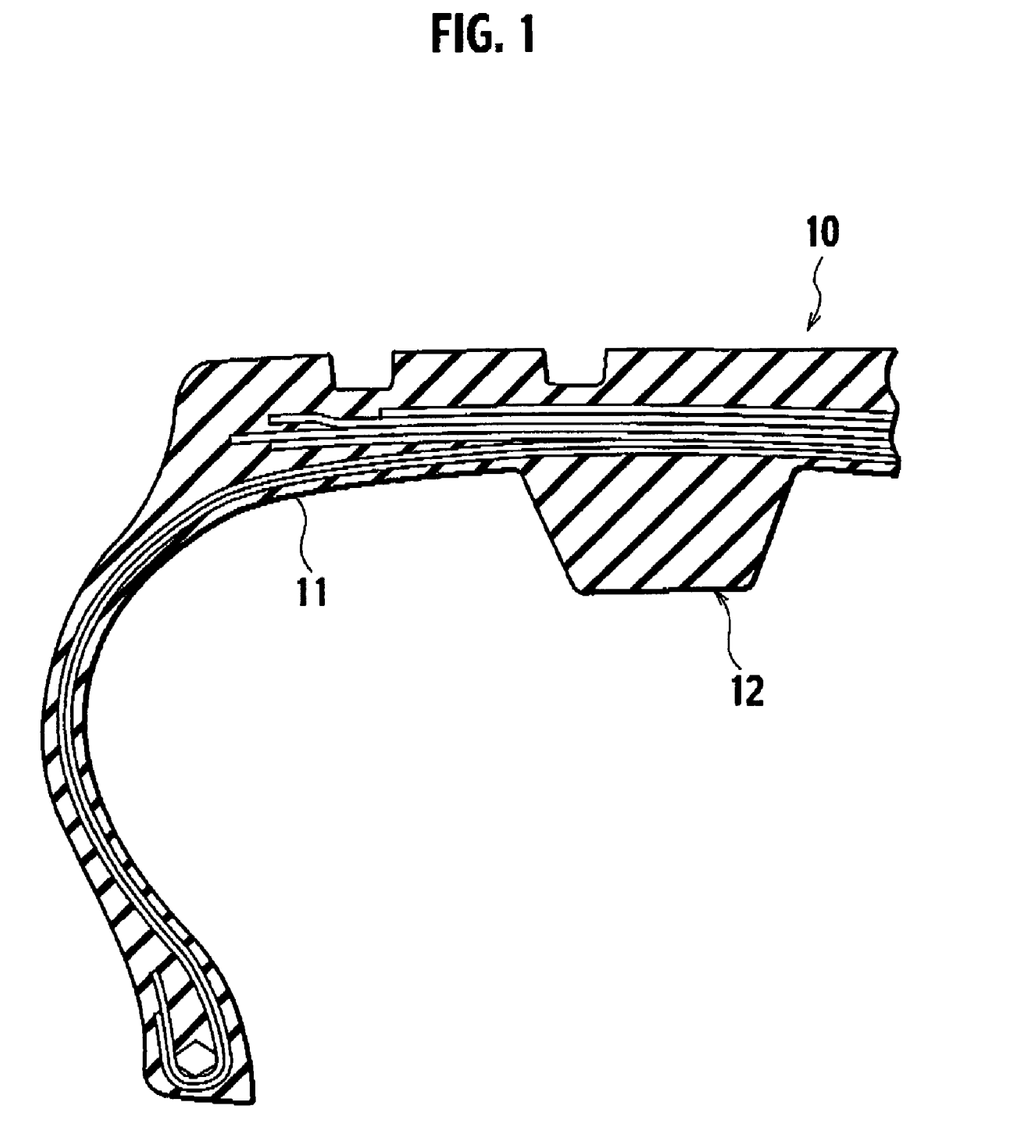
FIG. 1 is a cross-sectional view of a pneumatic tire in a widthwise direction of a tread of the pneumatic tire, the pneumatic tire including an electronic-device housing apparatus support according to an embodiment of the present invention.

FIG. 1 is a cross-sectional view of a pneumatic tire 10 on which an electronic-device housing apparatus support 12 constituting the pneumatic-tire-use electronic device fixing system according to the present embodiment is provided, the cross-sectional view being taken in a widthwise direction of a tread thereof. Note that, in the present embodiment, the pneumatic-tire-use electronic device fixing system is constituted of an electronic-device housing apparatus 30 and a lock pin 50, both of which will be described later, in addition to the electronic-device housing apparatus support 12.

Additionally, a pneumatic-tire-use electronic device corresponds to, for example: a sensor which measures an internal pressure, an internal temperature, and the like of the pneumatic tire 10, and transmits a result of the measurement to a vehicle via radio communications; an IC chip storing, for example, information on management by a manufacturer of the pneumatic tire; or the like.

As shown in FIG. 1, on an inner surface of the pneumatic tire 10 according to the present invention, an inner liner 11 which is a rubber layer preventing penetration of pressurized air filled in the pneumatic tire 10 is provided.

Additionally, within the inner surface of the pneumatic tire 10 according to the present invention, the electronic-device housing apparatus support 12 which supports the later described electronic-device housing apparatus 30 is provided on a central portion of a back side of the tread.

Furthermore, in the present embodiment, the electronic-device housing apparatus support 12 is provided inside the pneumatic tire 10 inward of the inner liner 11. That is, the electronic-device housing apparatus support 12 is covered with the inner liner 11.

Figure 2:
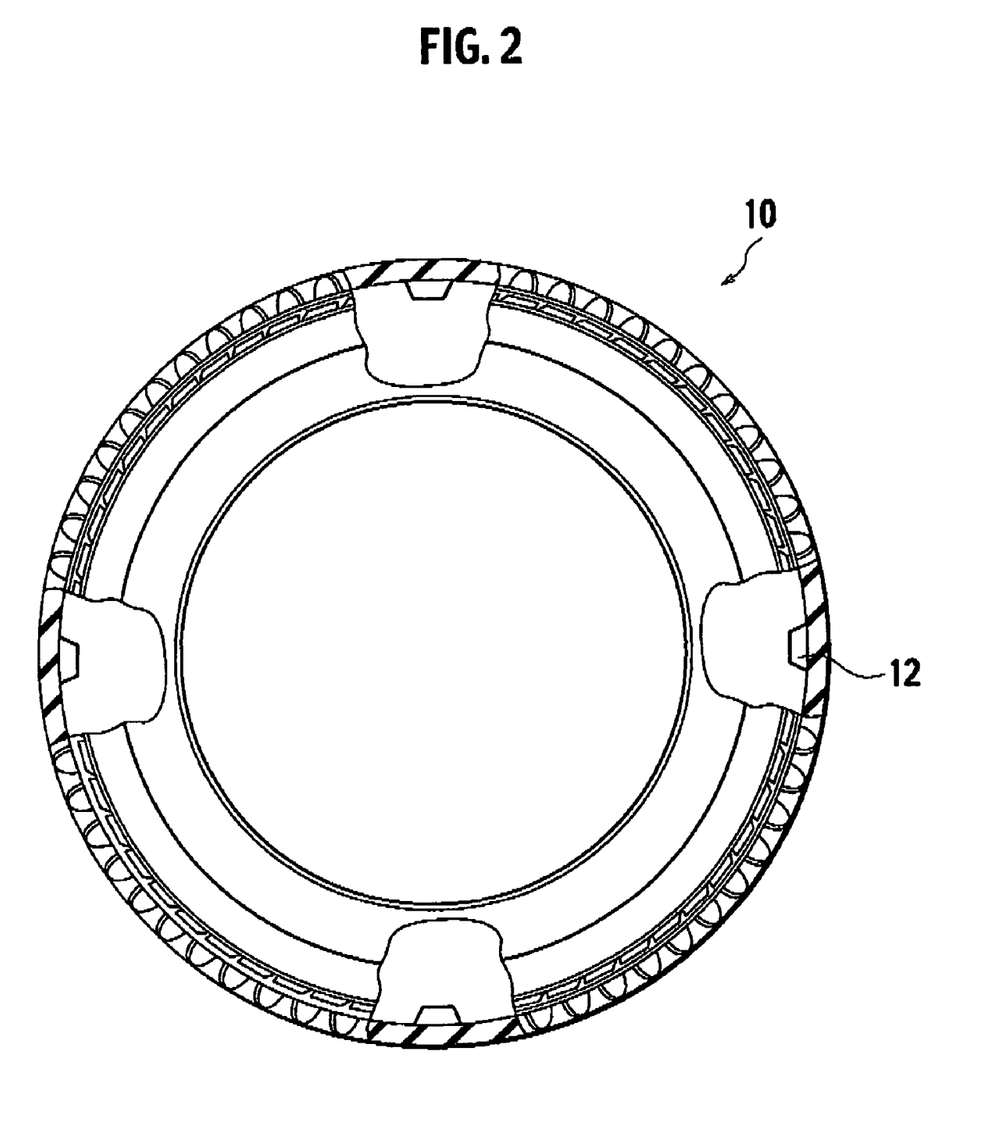
FIG. 2 is a partially transparent front elevational view of the pneumatic tire according to the embodiment of the present invention.

FIG. 2 is a partially transparent front elevational view of the pneumatic tire 10 according to the present invention. As shown in this drawing, on a periphery of the inner surface of the pneumatic tire 10, the electronic-device housing apparatus supports 12 are provided respectively in four locations with substantially regular intervals.

Note that locations for the electronic-device housing apparatus supports 12 are not limited to four locations, and may be, for example, two locations, or eight locations. Additionally, in view of securing balance of the pneumatic tire when the pneumatic tire is rotating, it is preferable that distances between adjacent two of the respective electronic-device housing apparatus supports 12 on the circumference of the inner surface of the pneumatic tire 10 be equal.

Next, structures of the electronic-device housing apparatus support 12, the electronic-device housing apparatus 30 and the lock pin 50, which constitute the pneumatic-tire-use electronic device fixing system according to the present embodiment, will be described.

Figure 3:
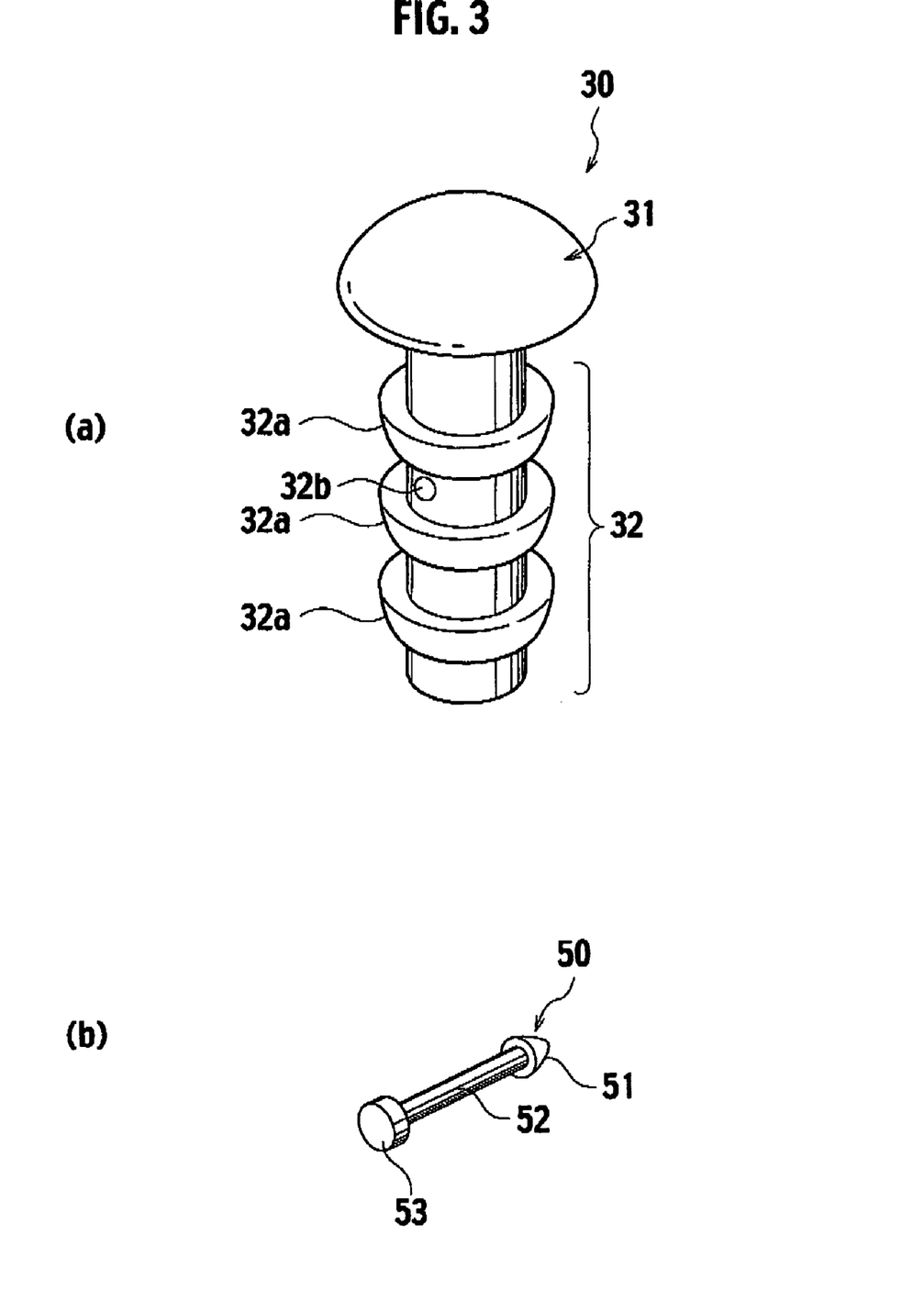
FIGS. 3A and 3B are perspective views respectively of an electronic-device housing apparatus and a lock pin both according to the embodiment of the present invention.

(1) Electric-device Housing Apparatus:

First of all, the structure of the electronic-device housing apparatus 30 according to the present embodiment will be described. FIG. 3A is a perspective view of the electronic-device housing apparatus 30 according to the present embodiment. As shown in this drawing, the electronic-device housing apparatus 30 includes an electronic-device housing portion 31, and an engaging convex portion 32.

The electronic-device housing portion 31 houses an electronic device, such as: a sensor, which measures an internal pressure and an internal temperature of the pneumatic tire 10, and which transmits a result of the measurement to a vehicle via radio communications; or an IC chip which stores information on management by a manufacturer of the pneumatic tire, and the like. Note that a volume of the electronic-device housing portion 31 can be changed as appropriate in accordance with a size of the electronic device intended to be housed therein.

The engaging convex portion 32 is formed in a convex shape, and is configured to be inserted into an engaging concave portion 12sh (refer to FIG. 4) provided in the electronic-device housing apparatus support 12. Additionally, projections 32a (first pullout suppression means) which suppress pullout from the engaging concave portion 12sh are provided on a surface of the engaging convex portion 32, whereby zigzag regions are formed on the engaging convex portion 32.

Furthermore, in this embodiment, each of the projections 32a has a shape which forms an acute angle to a direction in which the engaging convex portion 32 is pulled out. Thereby, the engaging convex portion 32, i.e., the electronic-device housing apparatus 30 is configured not to be easily pulled out from the engaging concave portion 12sh although the engaging convex portion 32 on which the projections 32a are provided is configured to be easily inserted into the engaging concave portion 12sh (refer to FIGS. 3A, 5B and 5C).

Additionally, the engaging convex portion 32 includes an insertion hole 32b (a first insertion hole). The later described lock pin 50 is inserted into the insertion hole 32b.

Note that the same rubber-based material as the one used for the electronic-device housing apparatus support 12 can be used as a material for the engaging convex portion 32.

(2) Lock Pin:

FIG. 3B is a perspective view of the lock pin 50 according to the present embodiment. As shown in this drawing, the lock pin 50 includes a tapering end portion 51, a shaft portion 52, and a locking portion 53.

The lock pin 50 is inserted into an insertion hole 12fh (refer to FIG. 4) and the insertion hole 32b which have been made to communicate with each other by having the electronic-device housing apparatus 30 (the engaging convex portion 32) inserted into the electronic-device housing apparatus support 12 (the engaging concave portion 12sh).

While having a front end tapering, the tapering end portion 51 has a rear end, which abuts the shaft portion 52, having a width wider than a diameter of the shaft portion 52. Additionally, diameters of the insertion hole 12fh and the insertion hole 32b are substantially equal to the diameter of the shaft portion 52. That is, the lock pin 50 has a structure which makes it unable to be pulled out once it is inserted into the insertion hole 12*fh* and the insertion hole 32*b*.

The locking portion 53 is configured to lock the shaft portion 52 into which the insertion hole 12*fh* and the insertion hole 32*b*, and thereby prevent the shaft portion 52 from coming out of the insertion hole 12*fh* and the insertion hole 32*b*.

Note that, for example, plastic can be used as a material for the lock pin 50.

Figure 4:
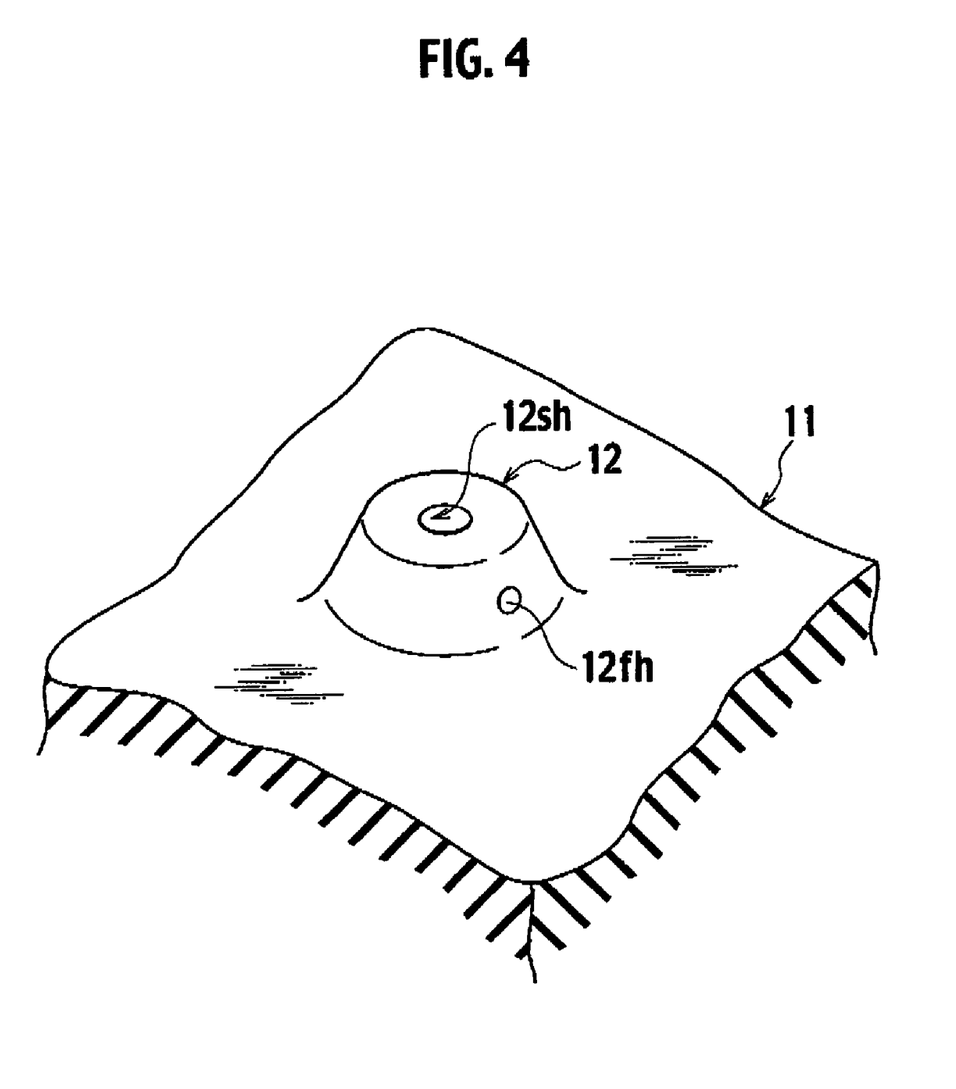
FIG. 4 is a perspective view of the electronic-device housing apparatus support according to the embodiment of the present invention.

(3) Electric-device Housing Apparatus Support:

FIG. 4 is a perspective view of the electronic-device housing apparatus support 12 according to the present embodiment. As shown in this drawing, the electronic-device housing apparatus support 12 has a "pedestal"-like shape formed in a truncated cone.

The engaging concave portion 12*sh* is formed in a concave shape, and is configured to have the engaging convex portion 32, which is provided to the electronic-device housing apparatus 30, inserted therein.

Additionally, the electronic-device housing apparatus support 12 includes the insertion hole 12*fh* (a second insertion hole) communicating with the insertion hole 32*b* provided in the engaging convex portion 32. The lock pin 50 is inserted into the insertion hole 12*fh* as described above.

Additionally, the electronic-device housing apparatus support 12 is provided inside the pneumatic tire 10 inward of the inner liner 11, and is formed of a rubber body in the present embodiment. Note that the electronic-device housing apparatus support 12 may be formed of the inner liner 11 itself.

Figure 10:
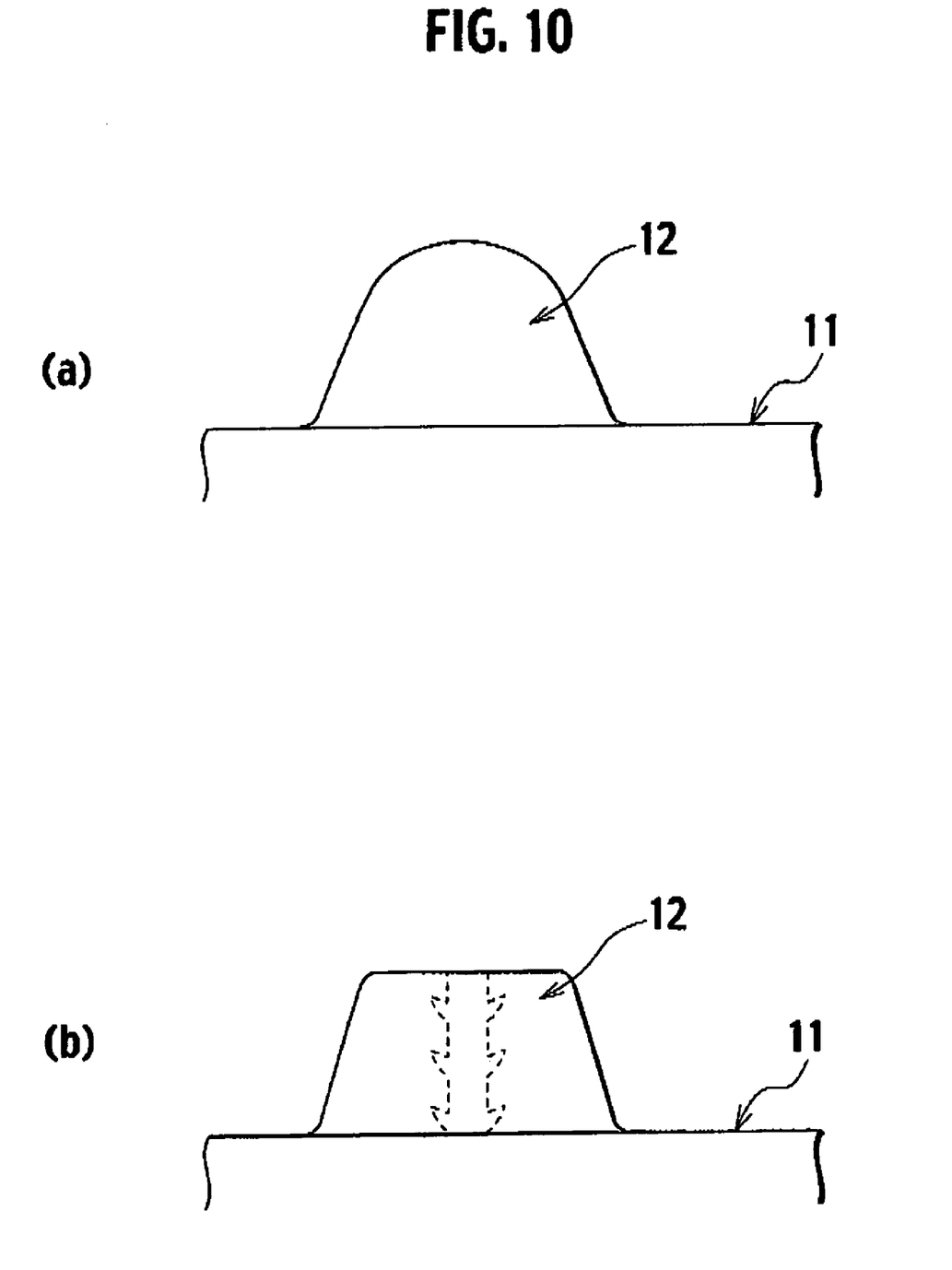
FIGS. 10A to 10B are explanatory diagrams for explaining steps of providing the electronic-device housing apparatus support according to the embodiment of the present invention to the pneumatic tire.

Furthermore, in the present embodiment, the electronic-device housing apparatus support 12 is provided on the pneumatic tire 10 in steps of molding and vulcanizing the pneumatic tire 10. FIGS. 10A and 10B are explanatory diagrams respectively for explaining states where the electronic-device housing apparatus support 12 is provided on the pneumatic tire 10 in the steps of molding and vulcanizing the pneumatic tire 10.

FIG. 10A is a cross-sectional view of the electronic-device housing apparatus support 12, the cross-sectional view showing a state where the rubber body constituting the electronic-device housing apparatus support 12 is provided, in the step of molding the pneumatic tire 10, inside the pneumatic tire 10 in a radial direction thereof inward of the inner liner 11.

FIG. 10B is a cross-sectional view of the electronic-device housing apparatus support 12 after the pneumatic tire 10 has been vulcanized. As shown in this FIG. 10B, the engaging concave portion 12*sh* is provided in the step of vulcanizing the pneumatic tire 10.

(Method of Fixing Electronic Device to Pneumatic Tire)

By referring to FIGS. 5A to 5C, a method of fixing an electronic device to a pneumatic tire by use of the above described pneumatic-tire-use electronic-device fixing system will be described.

Figure 5:
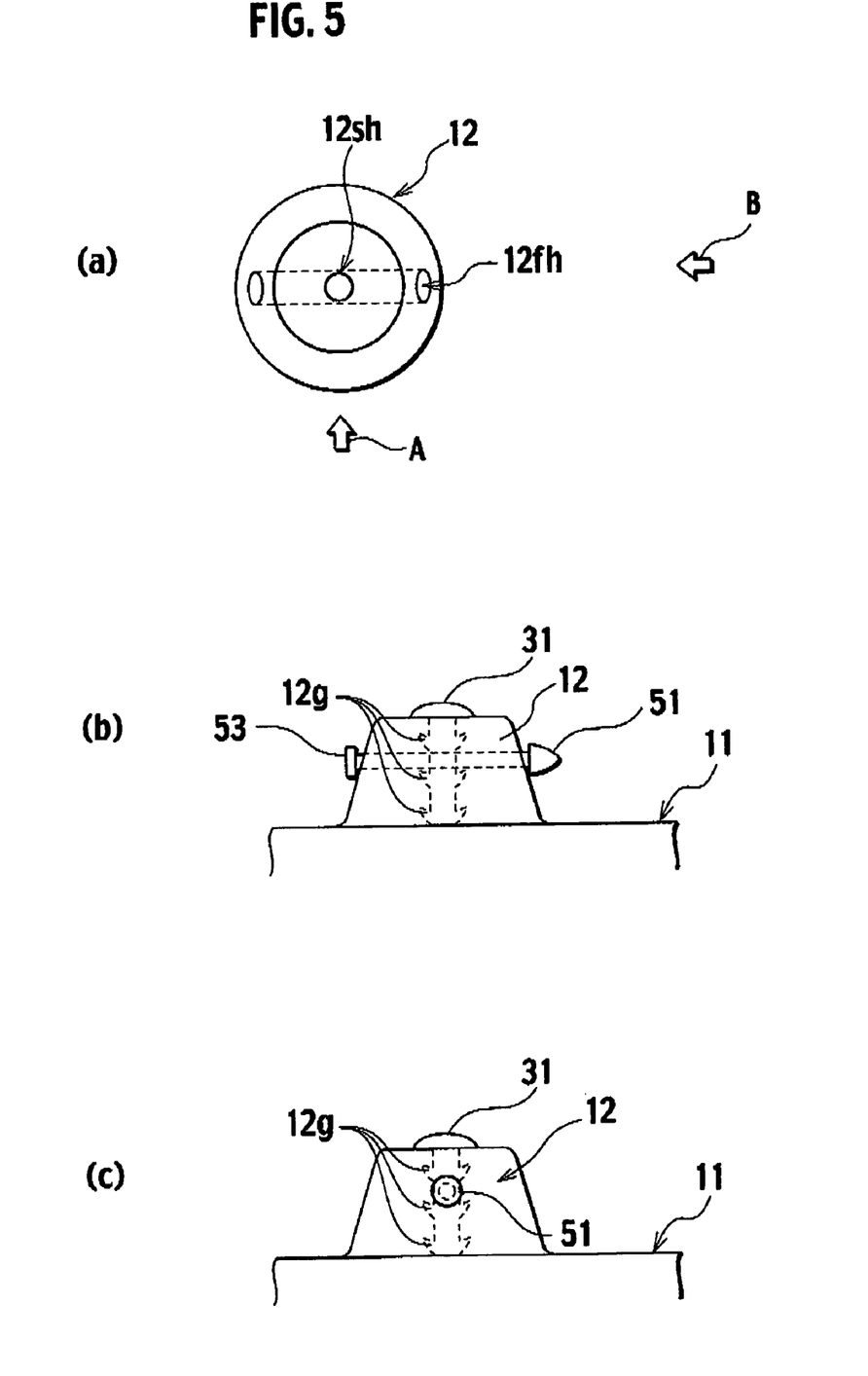
FIGS. 5A to 5C are explanatory diagrams for explaining a method of fixing an electronic device to the pneumatic tire by use of a pneumatic-tire-use electronic-device fixing system according to the embodiment of the present invention.

FIG. 5A shows a plan view of the electronic-device housing apparatus support 12. As shown in this FIG. 5A, the engaging concave portion 12*sh* is provided substantially in the center of the electronic-device housing apparatus support 12.

Additionally, as shown in this FIG. 5A, the insertion hole 12*fh* penetrate the electronic-device housing apparatus support is 12 in a manner passing through the center of the electronic-device housing apparatus support 12.

FIG. 5B shows a side view of the electronic-device housing apparatus support 12 when viewed in a direction of an arrow A shown in FIG. 5A. Additionally, FIG. 5B shows a state where, while the electronic-device housing apparatus 30 is being inserted into the engaging concave portion 12*sh*, the lock pin 50 is being inserted into the insertion hole 12*fh*.

As shown in this FIG. 5B, engaging grooves 12*g* (second pullout suppression means) engaging with the respective projections 32*a* are provided on an inner surface of the engaging concave portion 12*sh*, whereby zigzag regions are formed on the engaging concave portion 12*sh*. As shown in this FIG. 5B, the lock pin 50 is inserted into both of the insertion hole 12*fh* provided in the electronic-device housing apparatus support 12, and the insertion hole 32*b* provided in the engaging convex portion 32 of the electronic-device housing apparatus 30.

FIG. 5C shows a side view of the electronic-device housing apparatus support 12 when viewed in a direction of an arrow B shown in FIG. 5A. Additionally, FIG. 5C shows a state where, while the electronic-device housing apparatus 30 is being inserted into the engaging concave portion 12*sh*, the lock pin 50 is being inserted into the insertion hole 12*fh*.

(Functions and Effects)

According to the pneumatic-tire-use electronic-device fixing system according to the above described present embodiment, the second pullout suppression means (the engaging grooves 12*g*) for engaging with the first pullout suppression means (the projections 32*a*) provided on the electronic-device housing apparatus 30 is provided on at least a part of the surface of the engaging concave portion 12*sh* of the electronic-device housing apparatus support 12, whereby the electronic-device housing apparatus 30 can be securely fixed to the pneumatic tire 10.

Furthermore, according to the present embodiment, the electronic-device housing apparatus support 12 provided on the inner surface of the pneumatic tire 10 can be formed in a "pedestal"-like shape, not a projecting shape, the "pedestal"-like shape having an increased contact area with the inner surface of the pneumatic tire 10.

For this reason, even in a case where the electronic device (the electronic-device housing apparatus 30) is not mounted on the electronic-device housing apparatus support 12, breakage of the electronic-device housing apparatus support 12 due to contact can be prevented on such occasions as when the pneumatic tire 10 is mounted onto a wheel. Additionally, by increasing the contact area of the electronic-device housing apparatus support 12, stress on an attached portion of the electronic-device housing apparatus support 12 can be dispersed, whereby breakage of the electronic-device housing apparatus support 12 due to the stress can be reduced.

That is, according to these characteristics, while the pneumatic-tire-use electronic device can be securely fixed to the pneumatic tire, breakage of the electronic-device housing apparatus support 12 for fixing the pneumatic-tire-use electronic device can be suppressed.

Additionally, according to the present embodiment, the lock pin 50 is inserted into both of the insertion hole 32*b* provided in the electronic-device housing apparatus 30, and the insertion hole 12*fh* provided in the electronic-device housing apparatus support 12, whereby the electronic-device housing apparatus 30 and the electronic-device housing apparatus support 12 can be more securely fixed to each other.

Furthermore, according to the present embodiment, since the electronic-device housing apparatus support 12 is a rubber body provided inside the pneumatic tire 10 inward of the inner liner 11, the electronic-device housing apparatus support 12 can be provided on the pneumatic tire 10 in the steps of molding and vulcanizing the pneumatic tire 10. For this reason, it is possible to avoid work of additionally sticking the electronic-device housing apparatus support 12 after manufacturing the pneumatic tire 10.

Additionally, according to the present embodiment, since the electronic-device housing apparatus support 12 and the pneumatic tire 10 are integrally molded in the steps of molding and vulcanizing the pneumatic tire 10, the electronic-device housing apparatus support 12 can be prevented from coming unstuck from the inner surface of the pneumatic tire 10 while sufficient strength of the electronic-device housing apparatus support 12 can be secured.

MODIFIED EXAMPLE 1

As described above, although contents of the present invention have been disclosed by describing one embodiment of the present invention, it should not be understood that the present invention is limited by the descriptions and the drawings constituting a part of this disclosure. By this disclosure, various alternative embodiments, examples and operational techniques will be apparent to those skilled in the art.

Figure 6:
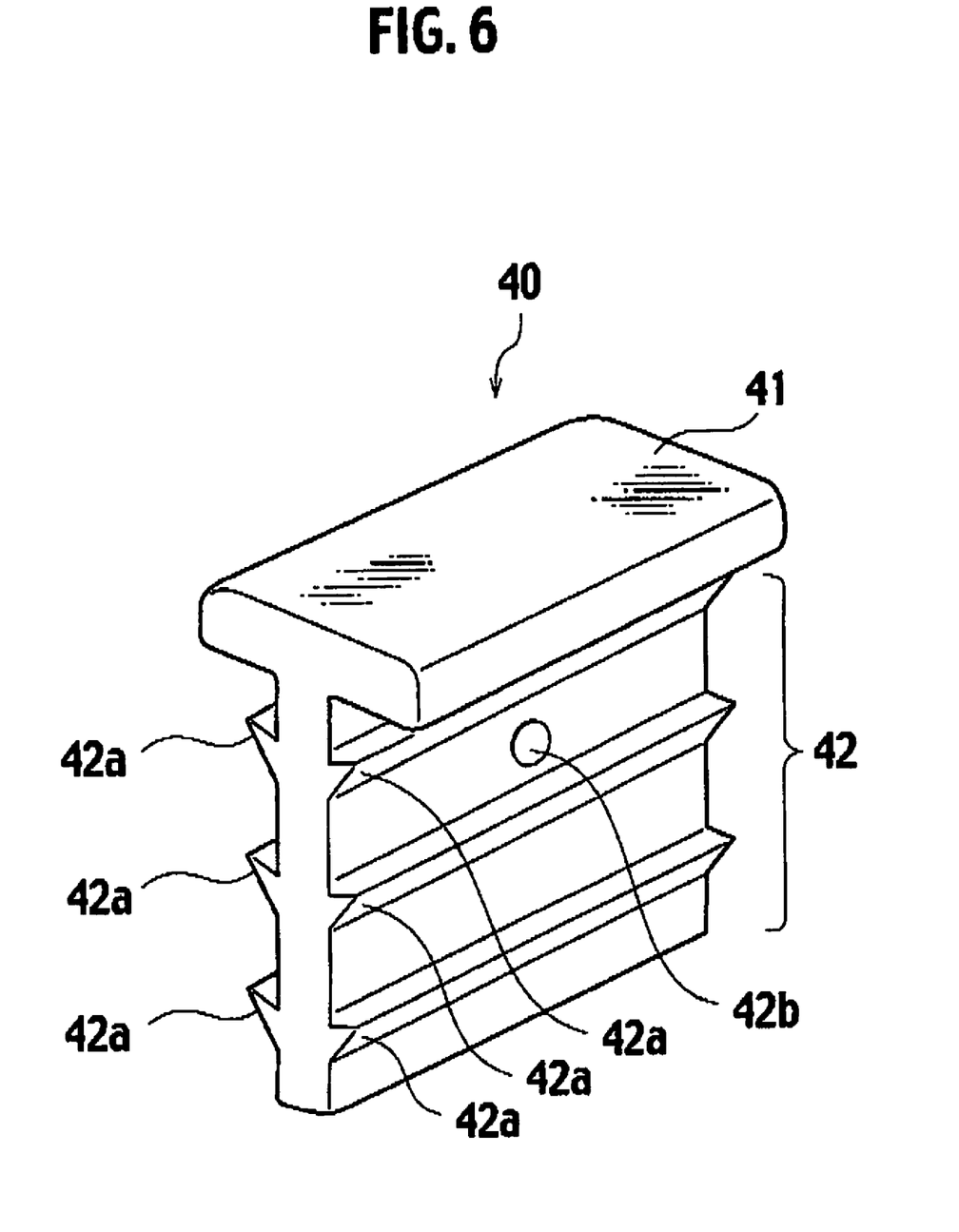
FIG. 6 is a perspective view of an electronic-device housing apparatus according to a modified example of the present invention.

For example, the present invention can be modified in the following manner. FIG. 6 is a perspective view of an electronic-device housing apparatus 40 according to a modified example of the present invention. Hereinafter, parts different from the foregoing pneumatic-tire-use electronic-device fixing system according to the present invention will be mainly described.

As shown in this drawing, the electronic-device housing apparatus 40 includes an electronic-device housing portion 41, and an engaging convex portion 42.

As in the case of the above described electronic-device housing portion 31, the electronic-device housing portion 41 houses an electronic device such as: a sensor which measures an internal pressure and an internal temperature of the pneumatic tire 10, and which transmits a result of the measurement to a vehicle via radio communications; or an IC chip, which stores information on management by a manufacturer of the pneumatic tire, and the like.

The engaging convex portion 42 is formed in a convex shape, and is configured to be inserted into an engaging concave portion 13sh (refer to FIG. 7) provided in a later described electronic-device housing apparatus support 13.

Additionally, projections 42a (first pullout suppression means) which suppress pullout from the engaging concave portion 13sh are provided on a surface of the engaging convex portion 42.

Furthermore, in the present embodiment, each of the projections 42a has a shape which forms an acute angle to a direction in which the engaging convex portion 42 is pulled out. Thereby, the engaging convex portion 42, i.e., the electronic-device housing apparatus 40 is configured not to be easily pulled out from the engaging concave portion 13sh although the engaging convex portion 42 on which the projections 42a are provided is configured to be easily inserted into the engaging concave portion 13sh (refer to FIGS. 6 and 8B).

Additionally, the engaging convex portion 42 includes an insertion hole 42b (a first insertion hole). The above described lock pin 50 is inserted into the insertion hole 42b.

Figure 7:
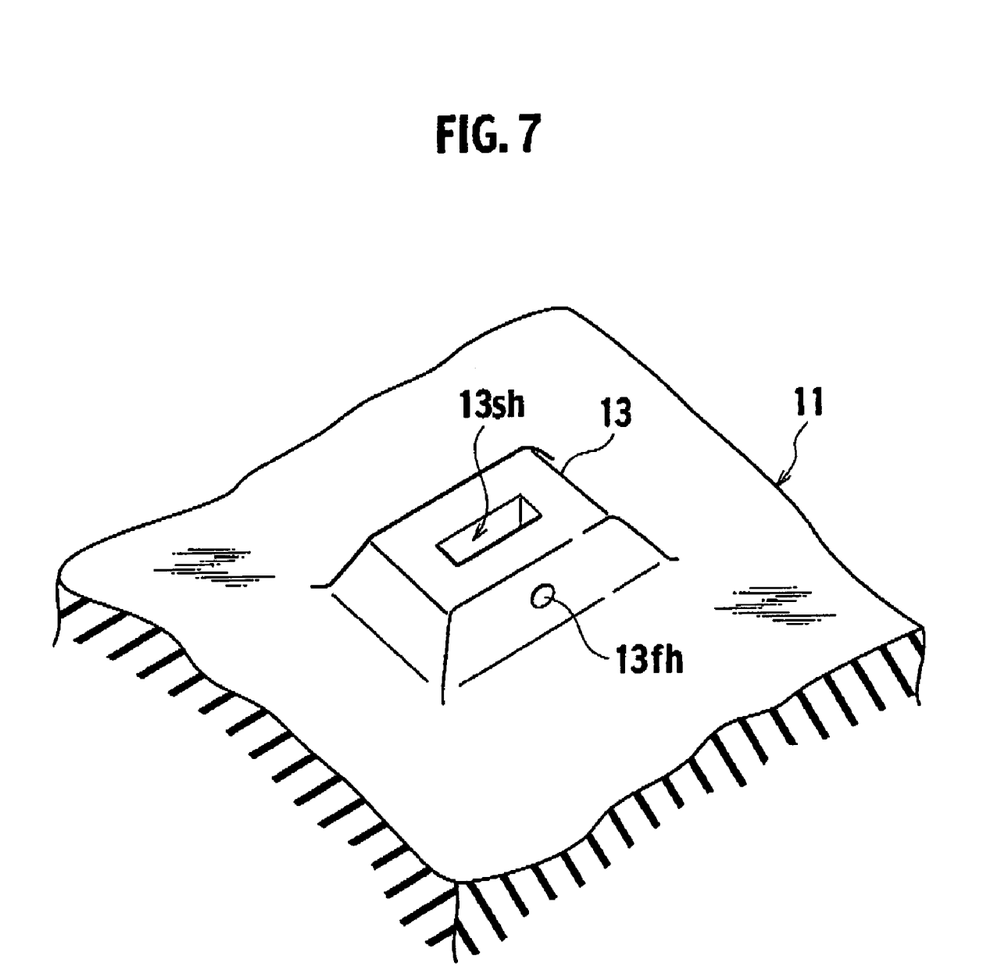
FIG. 7 is a perspective view of an electronic-device housing apparatus support according to the modified example of the present invention.

FIG. 7 is a perspective view of the electronic-device housing apparatus support 13 according to the modified example of the present invention. As shown in this drawing, the electronic-device housing apparatus support 13 has a "pedestal"-like shape formed in a truncated pyramid.

The engaging concave portion 13sh is formed in a concave shape, and is configured to have the engaging convex portion 42, which is provided in the electronic-device housing apparatus 40, inserted therein.

Additionally, the electronic-device housing apparatus support 13 includes an insertion hole 13fh (a second insertion hole) communicating with the insertion hole 42b provided in the engaging convex portion 42. The lock pin 50 is inserted into the insertion hole 13fh as described above.

Figure 8:
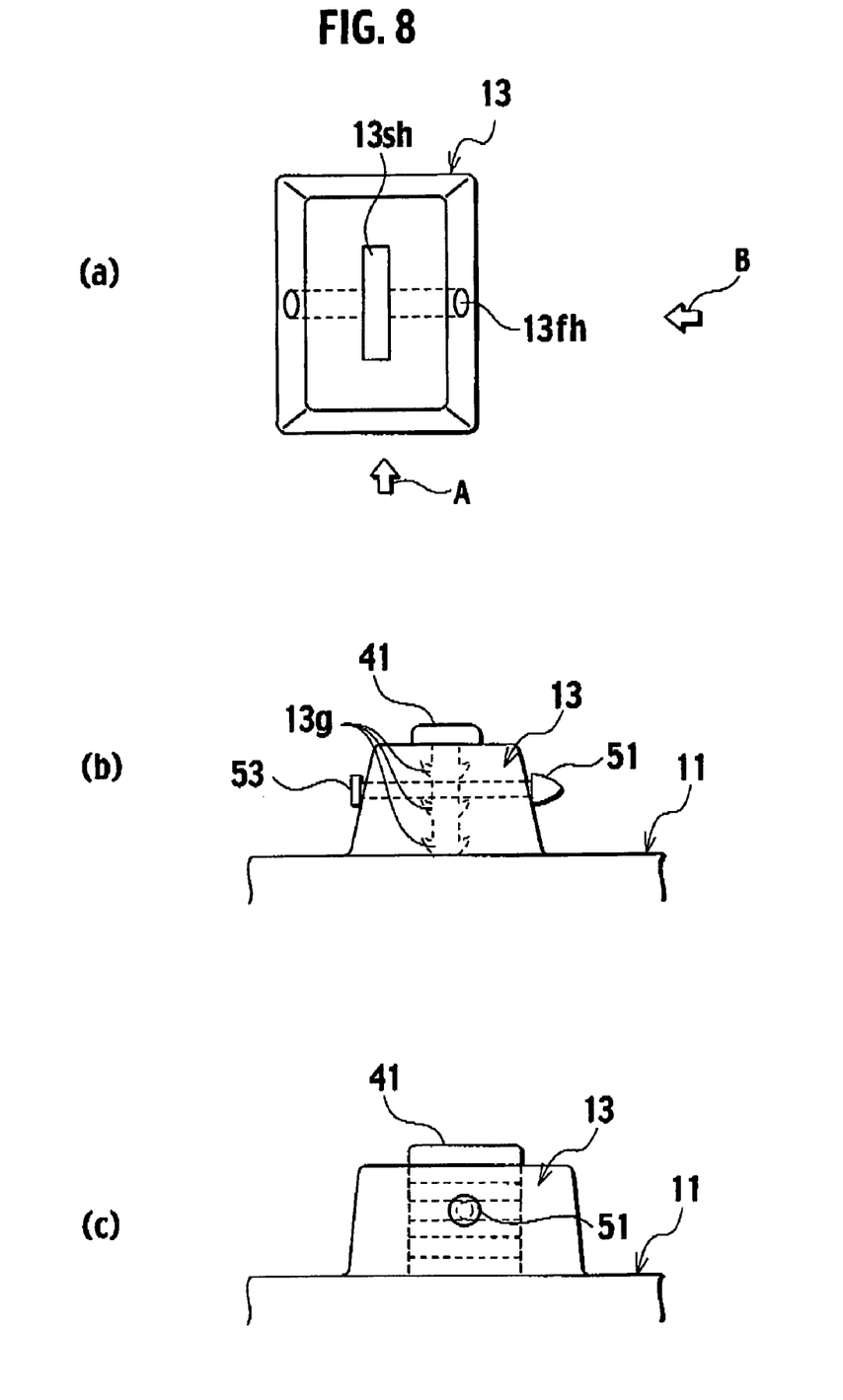
FIGS. 8A to 8C are explanatory diagrams for explaining a method of fixing an electronic device to the pneumatic tire by use of a pneumatic-tire-use electronic-device fixing system according to the modified example of the present invention.

FIGS. 8A to 8C are explanatory diagrams for explaining a method of fixing the electronic device to the pneumatic tire 10 by use of the electronic-device housing apparatus support 13, the electronic-device housing apparatus 40 and the lock pin 50, which have been described above.

Note that a description for FIGS. 8A to 8C will be omitted because FIGS. 8A to 8C are the substantially same as the method, which is shown in FIGS. 5A to 5C, of fixing the electronic device to the pneumatic tire 10 by use of the electronic-device housing apparatus support 12, the electronic-device housing apparatus 30 and the lock pin 50 according to the embodiment of the present invention.

Note that, as shown in FIG. 8B, the engaging grooves 13g (second pullout suppressing mean) engaging with the projections 42a are provided on a surface of the engaging concave portion 13sh.

MODIFIED EXAMPLE 2

Figure 9:
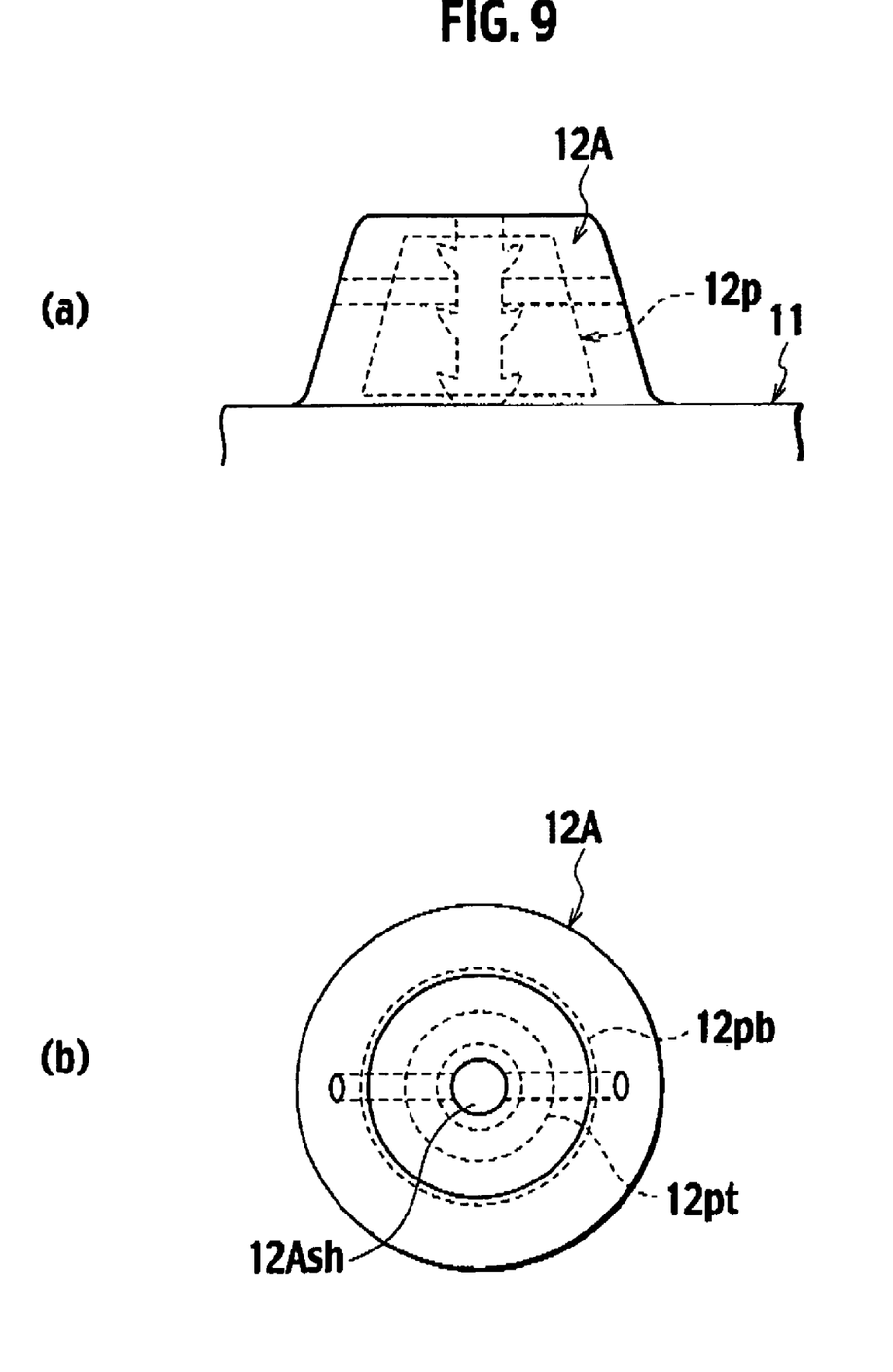
FIGS. 9A and 9B are respectively a side view and a plan view of an electronic-device housing apparatus according to another modified example of the present invention.

Additionally, not merely limited to the above described modified example, the present invention may be modified as follows. FIG. 9A is a side view of an electronic-device housing apparatus support 12A according to another modified example of the present invention. Additionally, FIG. 9B is a plan view of the electronic-device housing apparatus support 12A.

As shown in FIGS. 9A and 9B, the electronic-device housing apparatus support 12A has the similar external shape to that of the electronic-device housing apparatus support 12. On the other hand, a peripheral portion of an engaging concave portion 12Ash of the electronic-device housing apparatus support 12A is formed of a rigid body more rigid than a rubber body forming a part of the electronic-device housing apparatus support 12A other than the aforementioned periphery.

Specifically, the periphery of the engaging concave portion 12Ash is formed of a plastic member 12p, which is more rigid than the rubber body.

Additionally, as shown in FIG. 9B, the plastic member 12p has a shape of a truncated cone in which a top-portion circumference 12pt is shorter than a base-portion circumference 12pb.

According to this modified example, the peripheral portion of the engaging concave portion of the electronic-device housing apparatus support 12A is formed of the rigid body more rigid than the rubber, whereby the engaging convex portion 32 of the electronic-device housing apparatus 30 can be more surely fixed while excessive stress is prevented from being applied to the inner line 11 neighboring the engaging concave portion 12Ash.

MODIFIED EXAMPLE 3

Figure 11:
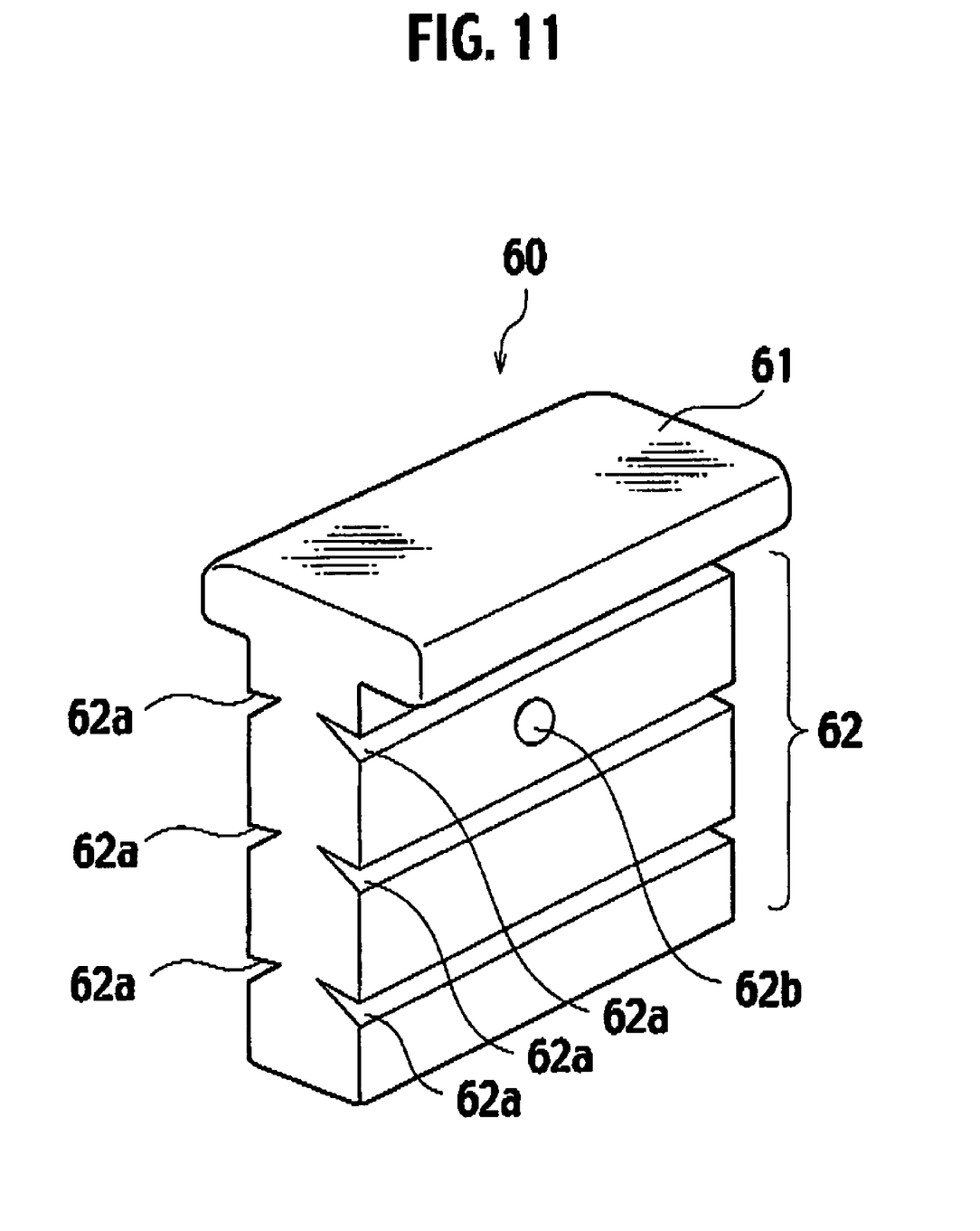
FIG. 11 is a perspective view of an electronic-device housing apparatus according to still another modified example of the present invention.

Additionally, not merely limited to the above described modified examples, the present invention may be modified as follows. FIG. 11 is a perspective view of an electronic-device housing apparatus 60 according to Modified Example 1 shown in FIG. 6.

As shown in FIG. 11, the electronic-device housing apparatus 60 includes an electronic-device housing portion 61 as and an engaging convex portion 62.

As in the case of the above described electronic-device housing portion 31, the electronic-device housing portion 61 houses an electronic device such as: a sensor, which measures an internal pressure and an internal temperature of the pneumatic tire 10, and which transmits a result of the measurement to a vehicle via radio communications; or an IC chip which stores information on management by a manufacturer of the pneumatic tire, and the like.

The engaging convex portion 62 is formed in a convex shape, and is configured to be inserted into an engaging concave portion provided in an electronic-device housing apparatus support (not illustrated).

Additionally, notches 52a (first pullout suppression means) which suppress pullout from the engaging concave portion of the electronic-device housing apparatus support are provided on a surface of the engaging convex portion 62.

Additionally, the engaging convex portion 62 includes an insertion hole 62b (a first insertion hole). The lock pin 50 is inserted into the insertion hole 62b.

Thus, it goes without saying that the present invention includes various embodiments and the like which are not described herein. Accordingly, a technical scope of the present invention is defined only by invention specifications according to the scope of claims, the invention specifications being appropriate based on the above descriptions.

INDUSTRIAL APPLICABILITY

As described above, the pneumatic-tire-use electronic-device fixing system according to the present invention is useful in techniques of manufacturing pneumatic-tire-use electronic devices because it makes it possible to securely fix a pneumatic-tire-use electronic device while making it possible to suppress breakage of a fixing portion for fixing the pneumatic-tire-use electronic device.

The invention claimed is:

1. A pneumatic-tire-use electronic-device fixing system for fixing an electronic device to be mounted on a pneumatic tire, the pneumatic-tire-use electronic-device fixing system comprising:
    an electronic-device housing apparatus, which houses the electronic device, and which includes an engaging convex portion that is convex; and
    an electronic-device housing apparatus support, which is provided on an inner surface of the pneumatic tire, and which includes an engaging concave portion that is concave, wherein:
    at least a part of a surface of the engaging convex portion includes a first zigzag region formed in a zigzag;
    at least a part of a surface of the engaging concave portion includes a second zigzag region formed in a zigzag, and the second zigzag region engaging with the first zigzag region; and
    the first zigzag region forms: a sloping portion tapering in a direction in which the engaging convex portion is inserted into the engaging concave portion; and a pullout suppression portion continuing to the sloping portion and being at an acute angle to a direction in which the engaging convex portion is pulled out from the engaging concave portion.

2. The pneumatic-tire-use electronic-device fixing system according to claim 1, wherein:
    the engaging convex portion includes a first insertion hole;
    the engaging concave portion includes a second insertion hole communicating with the first insertion hole,
    the pneumatic-tire-use electronic-device fixing system further comprising a lock pin to be inserted into the first and second insertion holes which have been made to communicate with each other.

3. The pneumatic-tire-use electronic-device fixing system according to claim 1, wherein the electronic-device housing apparatus support is a rubber body provided inside the pneumatic tire inward of an inner liner of the pneumatic tire.

4. The pneumatic-tire-use electronic-device fixing system according to claim 1, wherein the electronic-device housing apparatus support is provided on the pneumatic tire in steps of molding and vulcanizing the pneumatic tire.

5. The pneumatic-tire-use electronic-device fixing system according to claim 1, wherein:
    the first zigzag region and the second zigzag region engage with each other by having the engaging convex portion press-fitted into the engaging concave portion.

6. A pneumatic tire comprising an electronic-device housing apparatus support which supports an electronic device housing apparatus having an engaging convex portion that is convex, wherein:
    the electronic-device housing apparatus support is provided on an inner surface of the pneumatic tire, and includes an engaging concave portion that is concave;
    at least a part of a surface of the engaging concave portion includes a zigzag region formed in a zigzag, the zigzag region engaging with the engaging convex portion: and
    the zigzag region forms: a sloping portion tapering in a direction in which the engaging convex portion is inserted into the engaging concave portion; and a pullout suppression portion continuing to the sloping portion,
    and being at an acute angle to a direction in which the engaging convex portion is pulled out from the engaging concave portion.

7. The pneumatic tire according to claim 6, wherein the electronic-device housing apparatus support is a rubber body provided inside the pneumatic tire inward of an inner liner of the pneumatic tire.

8. The pneumatic tire according to claim 6, wherein the electronic-device housing apparatus support is provided on the pneumatic tire in steps of molding and vulcanizing the pneumatic tire.

9. The pneumatic tire according to claim 6, wherein:
    at least a part of the surface of the engaging convex portion is formed in a zigzag: and
    the zigzag region and the engaging convex portion engage with each other by having the engaging convex portion press-fitted into the engaging concave portion.

10. An electronic-device housing apparatus, which is supported by an electronic-device housing apparatus support including an engaging concave portion provided on a pneumatic tire, and which houses an electronic device to be mounted on the pneumatic tire, the electronic-device housing apparatus comprising an engaging convex portion that is convex, wherein:
    at least a part of a surface of the engaging convex portion includes a zigzag region formed in a zigzag; and the zigzag region forms: a sloping portion tapering in a direction in which the engaging convex portion is inserted into the engaging concave portion; and a pullout suppression portion continuing to the sloping portion and being at an acute angle to a direction in which the engaging convex portion is pulled out from the engaging concave portion.

11. The electronic device housing apparatus according to claim 10, wherein:

the engaging convex portion includes a first insertion hole;

the engaging concave portion includes a second insertion hole communicating with the first insertion hole; and the electronic-device housing apparatus is fixed by a lock pin inserted into the first and second insertion holes which have been made to communicate with each other.

* * * * *